C. B. BOYLE.
MODE OF COMBINING PHOTOGRAPHIC LENSES.
No. 52,129. Patented Jan. 23, 1866.
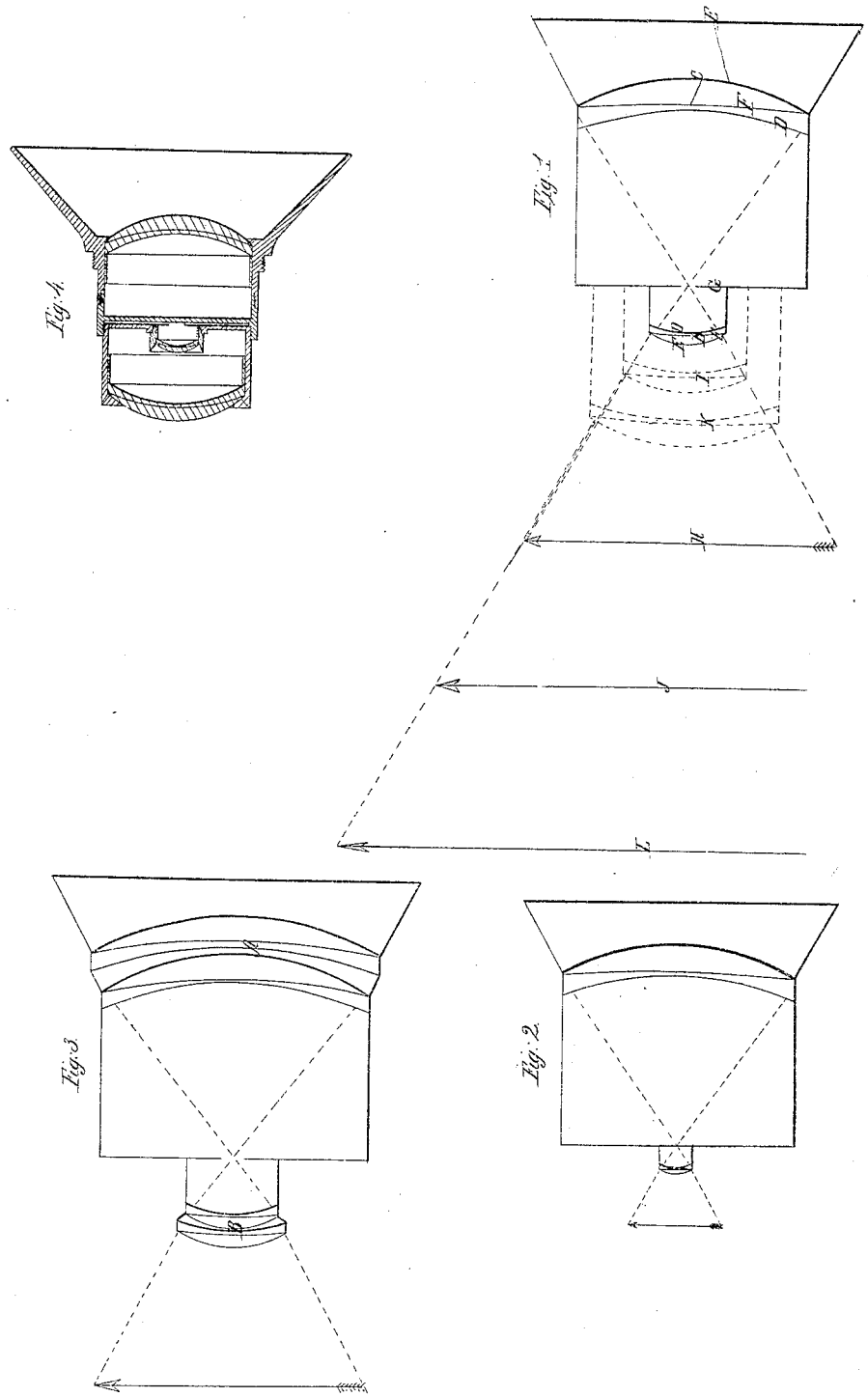

UNITED STATES PATENT OFFICE.

CHARLES B. BOYLE, OF NEW YORK, N. Y.

MODE OF COMBINING PHOTOGRAPHIC LENSES.

Specification forming part of Letters Patent No. 52,129, dated January 23, 1866.

*To all whom it may concern:*

Be it known that I, CHARLES B. BOYLE, of the city, county, and State of New York, have invented a new and Improved Mode of Combining Lenses; and I do hereby declare the following to be a full and exact description thereof, reference being had to the accompanying drawings and the letters of reference marked thereon.

The nature of my invention consists in combining two or more lenses in geometrical ratios of each other, so that whatever the result to be accomplished, whether it be a positive focus, as in the photographic camera, or a combination with the eye, as in the microscope and telescope, the result growing out of such ratios will be superior in definition and illumination to that obtained by any of the systems now in use.

One of the forms in which this law of ratios is used for the photographic camera is shown at Fig. 1. It will there be observed that the back or field lens, B, is an exact miniature transcript or copy of the front or object lens, C. Thus if the back lens, B, be one-quarter of the diameter of the front lens, C, all its corresponding parts will be in the same proportion—that is to say, the radius of the inner concave surface, D, of the small lens B will be one-quarter of the radius of the inner concave surface, D, of the large lens C, and the radius of the outer convex surface, E, of the small lens B one-quarter of the radius of the outer convex surface, E, of the large lens C, and the radii of their relative achromatizing lines F F in the same proportion, as well as the thickness of the glass, while the two lenses are placed in relation to the diaphragm G in the same ratio of distances. The image produced by this lens is perfectly correct in figure with the finest qualities of definition. It has the additional advantage of quick working, as all the power of a large front lens is delivered to a small back lens, and is condensed into a correspondingly small field. The time of its working therefore suffers a proportionate reduction, and this reduction of time may be carried to an almost unlimited extent by reducing the size of the back lens in a constant ratio of the large front lens, as shown by Fig. 2, where the back lens is half an inch in diameter, the front lens three inches and six-tenths, and the resulting picture, as shown by the arrow, one inch and five-tenths, the front lens being therefore over five and one-half times greater in area than the field over which its power is distributed. As a consequence of those results, it follows that a front lens of any given size may be accompanied by a "nest" of back lenses of different diameters, each of which, used in separate combination with the front lens, will give a different-sized picture, though working over the same angle, as shown in black, red, and blue arrows and dotted lines at Fig. 1, and it follows from this arrangement that four single achromatic lenses make three double achromatic combinations. So at pleasure we may remove the back lens, replacing it by any other, however large or small, but ever in geometrical ratios of the front lens, and always observing that the greater the superficial area of the front lens exceeds that of the back lens the greater will be the condensation of light on the field of the focus, and the shorter therefore will be the time of exposure.

The lenses B and C, Fig. 1, represent one double achromatic combination, the resulting field of which is found at the arrow H. The front lens, C, and the back lens, I, in red dotted lines, form (when the lens B is removed) another double achromatic combination, the resulting field of which is found at the red arrow J. The lens K, in blue dotted lines, forms, with the front lines C, (when the lenses B and I are removed,) a third double achromatic combination, the resulting field of which is found at the blue arrow L, and so on with any number of back lenses which we may choose to apply.

Another form of this mode of combination is represented at Fig. 3, where the front or object lens, A, is a double meniscus achromatic combination, and the back or field combination, B, exactly the same, though smaller. The object of this combination is to procure a short focus with larger back glasses, thereby admitting of a larger aperture in the diaphragm, and consequently more light to the field of the focus; but it is not to be understood that in the application of this law of geometrical ratios we are confined to any particular form of lenses.

What I claim as my invention, and desire to secure by Letters Patent of the United States, is—

The system of combining lenses in geometrical ratios of each other, as described and set forth in the foregoing specification and accompanying drawings.

CHAS. B. BOYLE.

Witnesses:
NELSON WRIGHT,
I. T. ACKERMAN.